Dec. 26, 1922.
A. J. VOSSBECK ET AL.
DRAFT APPLIANCE OR HITCH.
FILED JULY 23, 1921.
1,440,039.
2 SHEETS—SHEET 2.
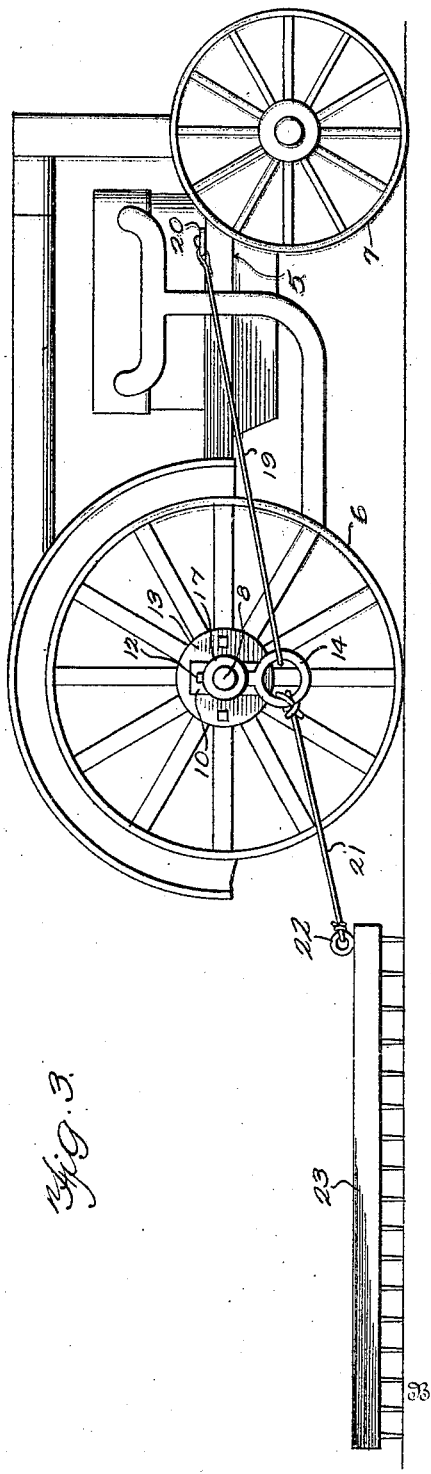
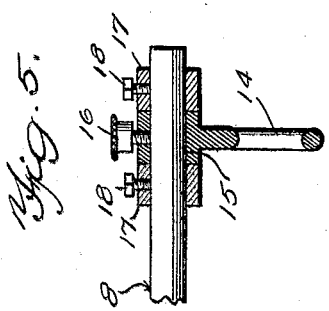
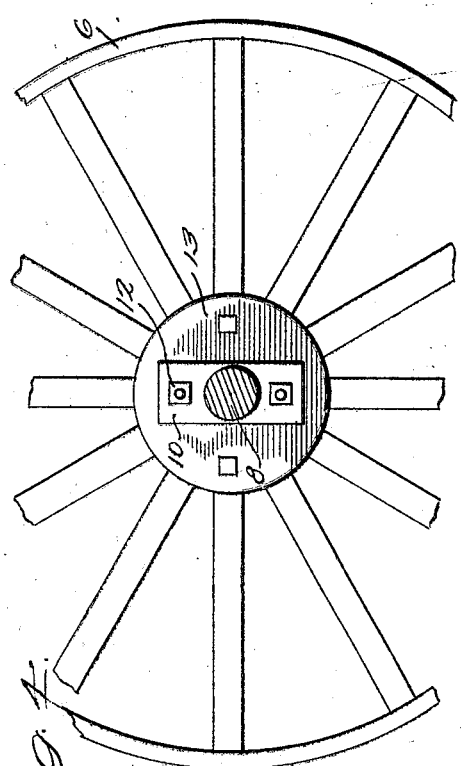
Inventor
A. J. Vossbeck
J. McCluskey
Attorney Patented Dec. 26, 1922.

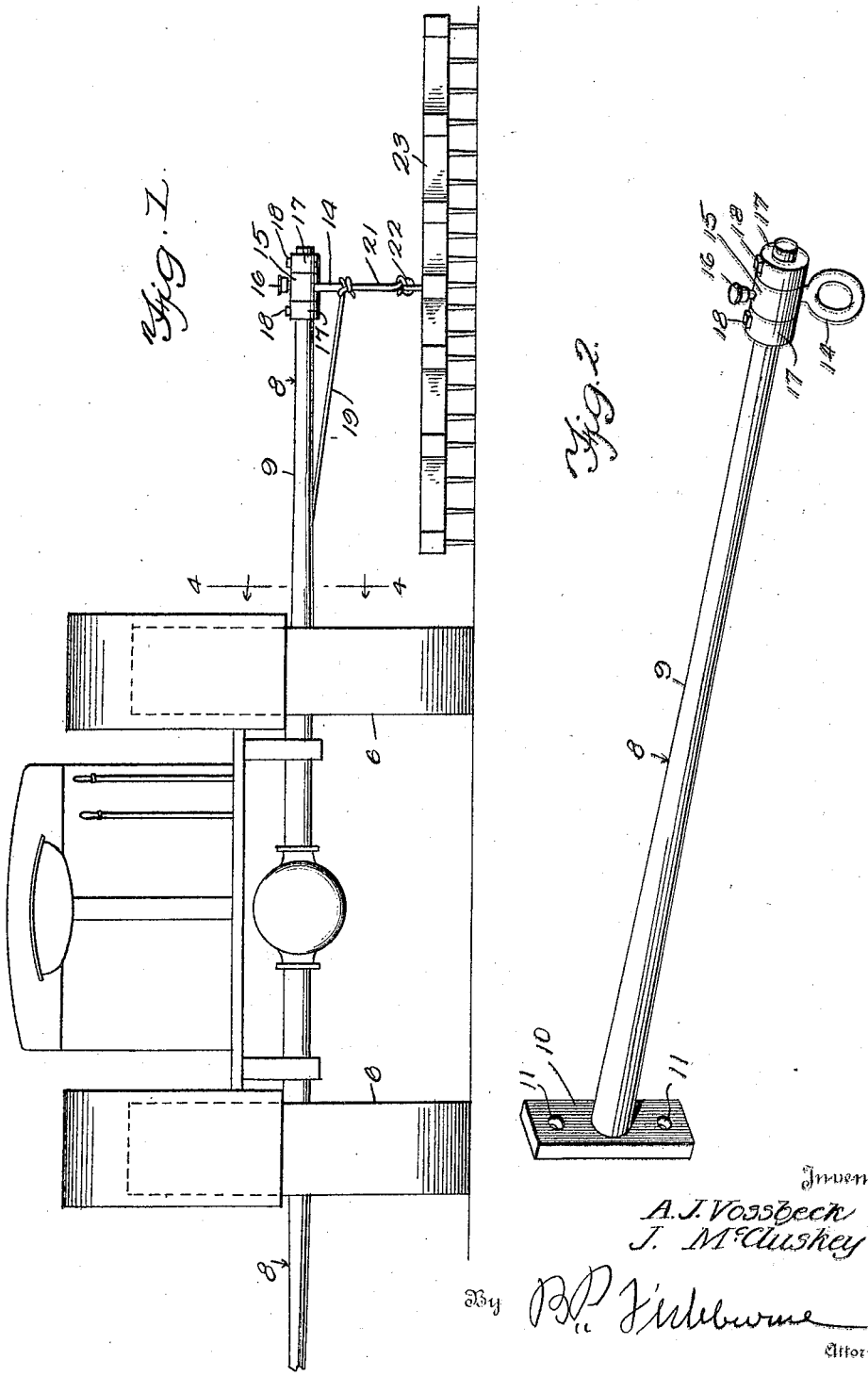

1,440,039

UNITED STATES PATENT OFFICE.

ALBERT J. VOSSBECK AND JOSEPH McCLUSKY, OF BISMARCK, NORTH DAKOTA.

DRAFT APPLIANCE OR HITCH.

Application filed July 23, 1921. Serial No. 487,167.

*To all whom it may concern:*

Be it known that we, ALBERT J. VOSSBECK and JOSEPH MCCLUSKY, citizens of the United States, residing at Bismarck, in the county of Burleigh and State of North Dakota, have invented certain new and useful Improvements in Draft Appliances or Hitches, of which the following is a specification.

Our invention relates to a draft appliance or hitch, for use in connection with tractors, such as the Fordson tractor, while not necessarily restricted to this use.

An important object of the invention is to provide a draft appliance or hitch adapted for connection with the hub of the traction wheel of the tractor, and by means of which an agricultural implement, such as a harrow, may be drawn by the tractor, upon one side thereof.

A further object of the invention is to provide a draft appliance or hitch which is extremely simple, strong, and durable.

A further object of the invention is to provide draft appliances or hitches which are adapted to be arranged upon both sides of the tractor, and secured thereto.

Other objects and advantages of the invention will be apparent during the course of the following description.

In the accompanying drawings, forming a part of this specification, and in which like numerals are employed to designate like parts throughout the same, Fig. 1 is a side elevation of a draft appliance or hitch, embodying our invention, showing the same in use, Fig. 2 is a perspective view of the device removed, Fig. 3 is a side elevation of a tractor, showing the device applied thereto, Fig. 4 is a section taken on line 4—4 of Fig. 1, showing the end of the draft appliance secured to the hub of the wheel, and, Fig. 5 is a longitudinal section through the collar of the hitch ring and associated elements.

In the drawings, wherein for the purpose of illustration is shown a preferred embodiment of our invention, the numeral 5 designates the frame or chassis of a tractor, such as a Fordson tractor, having rear traction wheels 6 and front steering wheels 7, as shown.

Our draft appliance embodies a rigid rod 8, formed of iron, steel or the like. The outer portion of this rod is cylindrical and of the same diameter, forwardly to a point 9, and then the rod preferably increases in diameter toward its inner end. An attaching plate or head 10 is suitably rigidly secured to the inner end of the rod, and this plate has openings 11. These openings are adapted to receive the bolts 12 upon the hub 13 of the traction wheel 6. In applying the device, the nuts from two of these bolts are removed, the bolts passed through the openings 11, and the nuts subsequently returned to their bolts and screwed up. The invention is not restricted to this precise manner of securing the plate 10 to the hub, as other means may be employed.

The numeral 14 designates a hitch ring, preferably formed integral with a collar 15, loosely mounted upon the outer portion of the rod 8. This collar has an opening for receiving a grease cup 16, to supply grease to the interior of the collar. The collar 15 may be adjusted longitudinally upon the outer portion of the rod 8, and held against longitudinal displacement, by lock collars 17, clamped to the rod by clamp bolts 18. The collar 15 is pivoted upon the rod between the collars 17.

The numeral 19 designates a flexible element or cable, the rear end of which is connected within a hitch ring 14, and the forward end suitably connected with the chassis 5, at 20. The cable 19 is diagonally arranged. A flexible element 21 is connected at its forward end with hitch ring 14 and extends rearwardly for connection at 22 with a ground treating implement, such as a harrow 23.

In view of the foregoing description, it will be seen that the longitudinal pull from the harrow 23 is transmitted to the chassis 5, through the flexible elements 19 and 21, while the rod 8 and associated elements hold the harrow and associated elements to one side of the tractor. Thus, a plow or other implement may be hitched directly to the rear of the tractor, and worked with the tractor. As shown in Fig. 1, two rods 8 may be arranged upon opposite sides of the tractor and used at the same time. The collar 15 is adjustable so that the harrow may be shifted laterally with relation to the tractor.

It is to be understood that the form of our invention herewith shown and described, is to be taken as a preferred example of the same, and that various changes in the shape, size and arrangement of parts may be resorted to without departing from the spirit of our invention or the scope of the subjoined claims.

Having thus described our invention, we claim:

1. The combination with the hub of a tractor wheel, of a rod connected with the hub and extending laterally therefrom for a substantial distance, a hitch element pivotally connected with the rod near its outer end, means for connecting the hitch element with the chassis of the tractor in advance of the rod, and means for connecting an implement with the hitch element in the rear thereof whereby the implement may travel substantially wholly upon one side of the tractor.

2. The combination with a tractor, of a substantially horizontal rod arranged near the wheel of the tractor and extending laterally therefrom and secured to the hub of the wheel, a hitch element loosely mounted upon the rod, a flexible element connecting the hitch element with a portion of the tractor in advance of the wheel, and an element for connecting the hitch element with an agricultural implement arranged in the rear thereof.

3. A draft appliance for tractors, comprising a rod adapted to be arranged generally horizontally upon the outer side of the wheel of the tractor and extending transversely of the plane of rotation of the wheel, means for connecting the inner end of the rod with the inner portion of the wheel, a hitch element carried by the rod, a pull element connected with the hitch element and connected with a portion of the tractor in advance of the hitch element, and a second pull element connected with the hitch element and adapted for connection with an agricultural implement to be arranged in the rear of the rod.

4. A draft appliance for tractors, comprising a rod adapted to be arranged upon the outer side of the wheel of the tractor and extending transversely of the plane of rotation of the wheel, means for attaching the rod to the inner portion of the tractor wheel, a pull element connected with the outer portion of the rod and extending forwardly for connection with a portion of the tractor in advance of the rod, and a second pull element connected with the rod and extending rearwardly for connection with an agricultural implement.

5. A draft appliance for tractors, comprising a rod adapted to be arranged upon the outer side of the wheel of the tractor and extending transversely of the plane of rotation of the wheel, means for attaching the rod to the inner portion of the wheel, a hitch element having a sleeve pivotally and longitudinally adjustably mounted upon the rod, a pull element to connect the hitch element with a portion of the tractor in advance of the hitch element, and a second pull element secured to the hitch element and extending rearwardly thereof for connection with an agricultural implement.

6. A draft appliance for tractors, comprising a rod, an attaching head secured to the inner end of the rod and having bolt receiving openings, a collar loosely mounted upon the outer portion of the rod and carrying a hitch ring, collars longitudinally adjustably mounted upon the rod upon opposite sides of the ring and having means whereby they may be clamped to the rod, and pull elements connected with the hitch ring.

In testimony whereof we affix our signatures.

ALBERT J. VOSSBECK.
JOSEPH McCLUSKY.